UNITED STATES PATENT OFFICE.

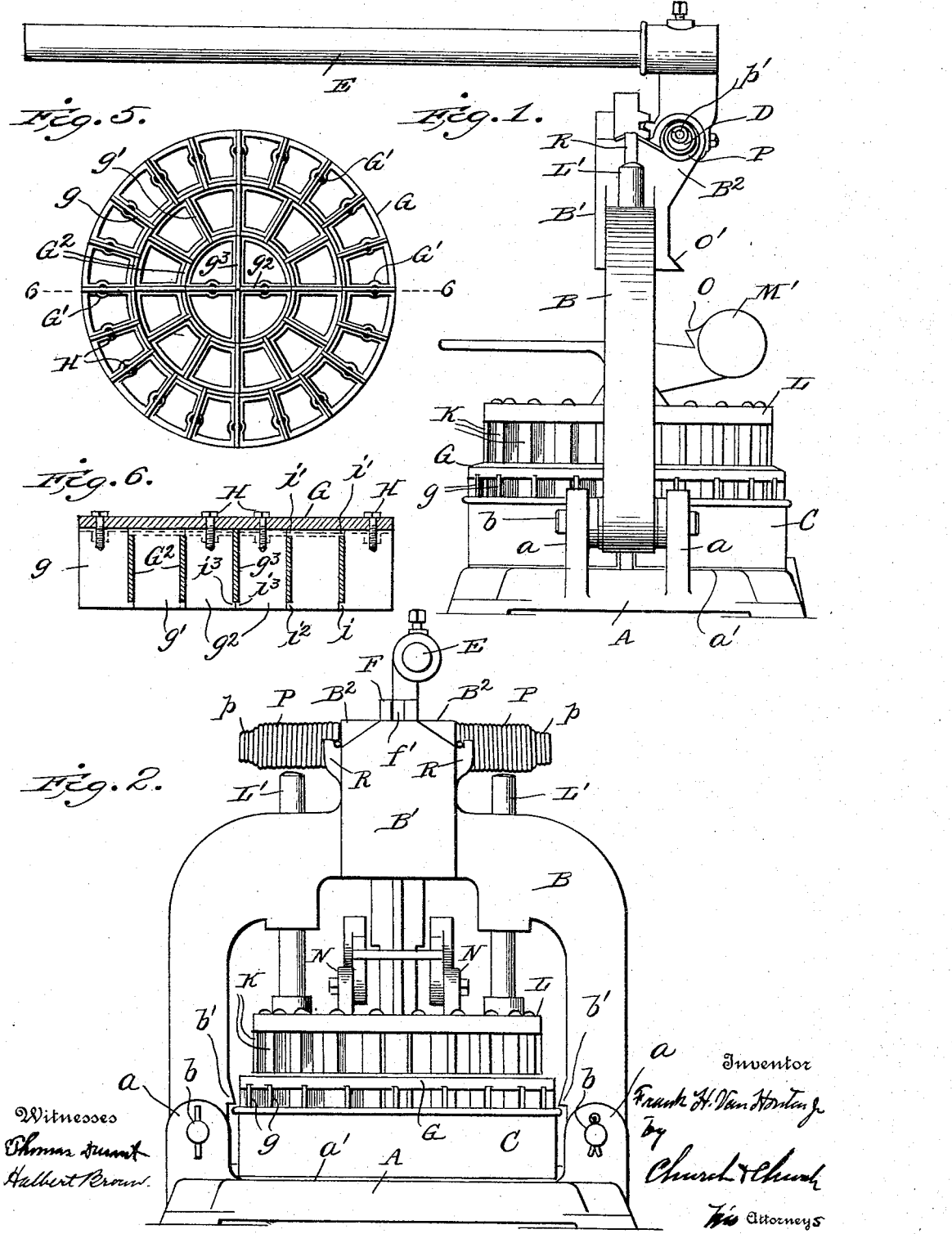

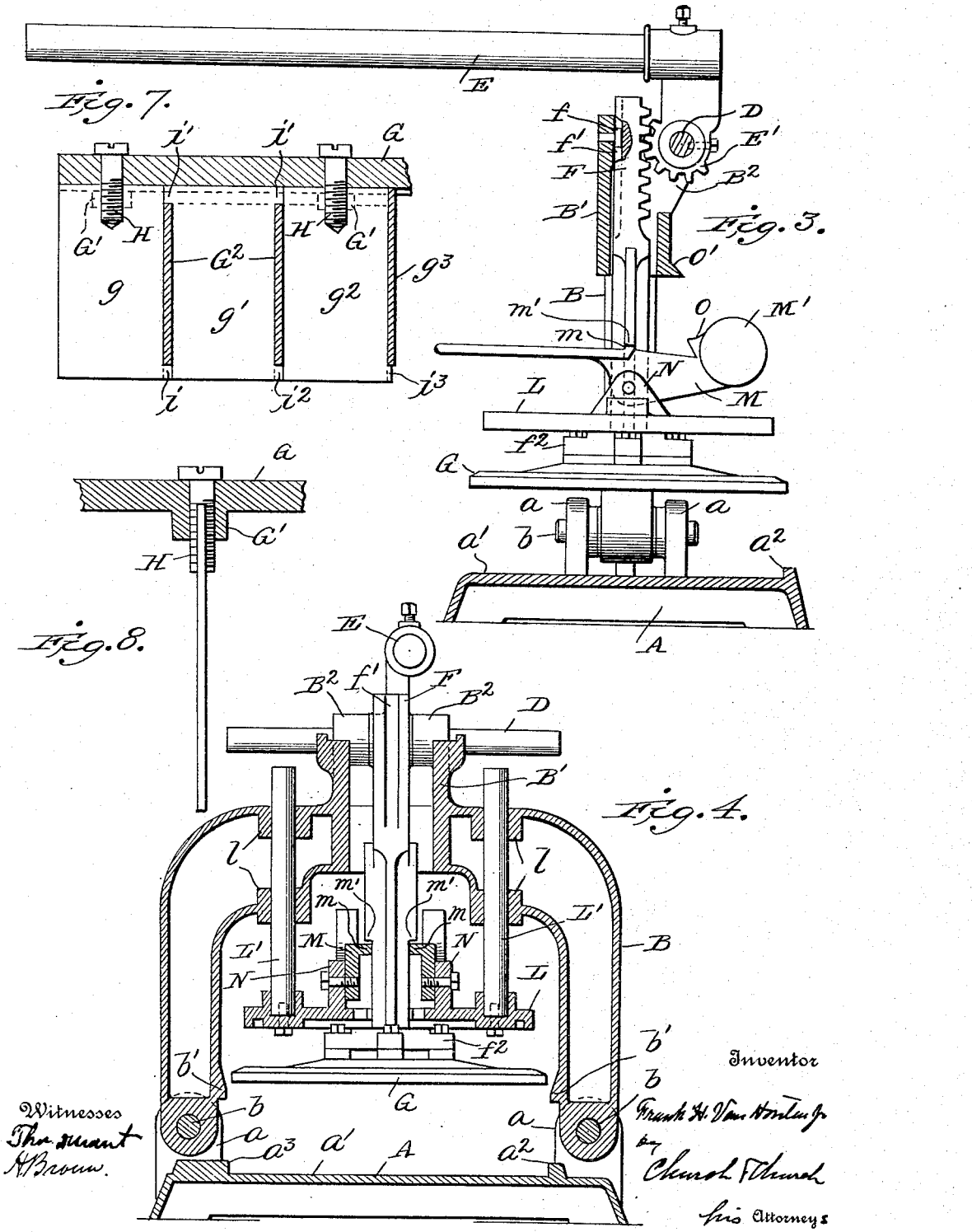

FRANK H. VAN HOUTEN, JR., OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-DIVIDING MACHINE.

1,177,835.  Specification of Letters Patent.  Patented Apr. 4, 1916.

Application filed March 29, 1913. Serial No. 757,700.

*To all whom it may concern:*

Be it known that I, FRANK H. VAN HOUTEN, Jr., a citizen of the United States, and resident of Fishkill-on-the-Hudson, in the county of Dutchess and State of New York, have invented certain new and useful Improvements in Dough-Dividing Machines; and I do hereby declare the following to be a full, clear, and exact description of the same, reference being had to the accompanying drawings, forming part of this specification, and to the figures and letters of reference marked thereon.

This invention relates to dough dividing machines of that type adapted to preliminarily press and distribute the dough in a suitable pan and then divide the same into portions of substantially uniform bulk, machines of this type being popularly called "roll" dough dividers because of the fact that the mass of dough is subdivided into portions of proper dimension for baking in the form of rolls.

The invention consists in certain novel details of construction and combinations and arrangements of parts all as will be hereinafter described and the particular features of novelty pointed out in the appended claims.

In the accompanying drawings,—Figure 1 is a side elevation of a divider embodying the present improvements. Fig. 2 is a front elevation of the same. Fig. 3 is a sectional elevation, the point of view corresponding to the point of view in Fig. 1, but with some of the parts, as for example, the pan, knives and pressing plungers being omitted. Fig. 4 is a similar view taken from the point of view of Fig. 2. Fig. 5 is a face view of the dividing knives and head in which they are mounted. Fig. 6 is a sectional elevation substantially on the line 6—6 of Fig. 5. Figs. 7 and 8 are enlarged sectional details of a portion of the knife carrying frame and knives, these two views being in plane at right angles to each other.

Like letters of reference in the several figures indicate the same parts.

The machine embodies generally a base A which may be seated on a bench, table or other support and suitably secured thereto so as to prevent tipping or displacement, said base having at each side upwardly extending ears $a$ between which the lower ends of a rigid yoke or arched frame B are secured by transverse pins $b$ one of which may be conveniently removed and the other form a pivot when it is desired to tip the frame to one side for cleaning purposes. The base A is provided with a flat seat or upper surface $a'$ on which a pan such as that indicated at C in Figs. 1 and 2 may be placed and positioned by lugs or projections $a^2$ and $a^3$, said pan being held against upward movement by inwardly extending lugs or projections $b'$ on the yoke frame B.

The yoke frame at the center is formed with an integral enlargement B' preferably having a rather large rectangular opening vertically through the same and is also, at one side provided with bearings $B^2$ for a horizontal shaft D forming a pivotal axis for the operating handle E, which latter is connected thereto through the medium of a gear segment E'.

A rack bar or plunger stem F is adapted to work vertically in the enlargement B' of the yoke and to mesh with the gear segment E' whereby it may be raised or lowered by the manipulation of the handle E. The said stem F is not adapted to fit tightly in the rectangular opening in the enlargement B' of the yoke frame, but takes its bearing on the inner face of the said enlargement opposite the gear segment E' and is preferably held in proper transverse alinement by a guide projection $f$ which enters a longitudinal groove $f'$ in the stem as shown clearly in Fig. 3. At its lower end the stem F is provided with transverse projections forming a foot $f^2$ adapted to be secured by bolts to the upper face or top of a knife carrying head G which head is preferably in the form of a spider having an unbroken periphery and radial connections extending therefrom to an intermediate ring, and radial connections extending from the latter to the central portion as best seen in Fig. 5 of the drawing, whereby a light and strong head is formed with ample spaces for the passage of the plunger or dough pressing facet stems, as will be hereinafter described, and at the same time giving a solid backing of metal in which the upper edges of the knives may be seated. These knives are formed in the preferred construction by unbroken rings $G^2$ and radial blades $g$ and $g'$ on the outer sides of the respective rings and central blades $g^2$ and $g^3$ within the inner ring. For securing the knives in place knife head G is provided with a series of channels or grooves in its under face in which the upper edges of the knives will fit accurately and intersected by said channels or grooves wherever a fastening screw is to be located, as will be presently described, are downwardly extending integral bosses or projections G′ best seen in Fig. 8 and in dotted lines in Fig. 7. The knives are secured firmly in their channels or grooves by screws H, which pass through the knife head G, through the bosses or projections G′, and for a considerable distance edgewise into the knives themselves, the constructions described not only making a firm connection but by reason of the backing afforded by the projections G′ on each side of the blade there is little or no danger of the knives either working loose or being distorted under a severe strain. Additional security for the knives is obtained and the number of fastening screws employed materially reduced by a system of interlocking the knives with each other, whereby certain of the knives will retain the others in place and all of the knives will be locked together in a substantial and rigid manner. In the preferred arrangement the outer radial knives $g$ and the inner oppositely disposed radial knives $g^2$ are the only knives secured in place by screws, as above described, all of the others, including the circular knives, being held firmly in place by the knives so secured. This result is accomplished by forming the outer radial knives $g$ with lugs $i$ projecting at one edge in position to seat in correspondingly shaped recesses in the outer edge of the circular knife $G^2$ while the intermediate radial knives $g′$ are formed with similar projections $i′$ on both of the edges and adapted to seat in the inner edges of both of the circular knives, said radial knives $g′$ also having projections $i^2$ exactly corresponding to the projections $i$ for seating in the outer edge of the inner circular knife. The central radial knives $g^2$ are each provided with projections $i^3$ seating in the outer edge of the central radial knives $g^3$ whereby the latter are held in place.

It will be noted from the construction described that the circular knives are firmly held between edge projections on the radial knives and the intermediate radial knives $g′$ are firmly held by edge projections interlocking with the inner edges of the circular knives, the result, as shown by practical demonstration, being that the whole structure is very rigid, each of its elements contributing to the support and rigidity of the others.

Fitting accurately in the spaces between the knives are a series of plungers each having a dough pressing face adapted to move down flush with the cutting edges of the knives, as is common in machines of this kind, and each of these plungers is provided with an upwardly extending stem K shown in Figs. 1 and 2 rigidly connected with a plunger head L. The plunger head L is conveniently a disk through which screws are passed into the ends of stems K so as to hold the plungers rigid with the head, whereby movements imparted to the head will be transmitted directly to the plungers. While the plunger head L surrounds the rack bar or stem F before described, it does not take a bearing thereon, but it is provided with substantially rigid upwardly extending guiding rods or stems L′ working vertically through bearings $l$ in the yoke frame B on opposite sides of the enlargement B′.

The knives are prevented from retreating above the faces of the plungers or the plungers moving below the edges of the knives by the foot $f^2$ on the rack bar or stem contacting with the under side of the plunger head, and in operation it is designed that if with the parts in this position, the handle be drawn forwardly it will depress them as a unit, thereby distributing and compressing the dough in the pan to a uniform density. It is then designed that the plunger head shall be permitted to remain stationary while the knives advance and divide the dough into portions as stated.

The simple form of mechanism adopted for operating the plunger head and plungers in the manner stated embodies a locking or catch member M pivotally mounted between upwardly extending lugs N on the plunger head L preferably on an axis which intersects the center line of the rack bar or stem F. This catch or locking member M is provided with locking faces or projections $m$, Figs. 3 and 4 adapted to pass under transverse shoulders or projections $m′$ on the stem F when the locking member is elevated to the position shown in Figs. 1 and 3. Depression of the forward end of the locking member M against the weight of the counterweights M′ on its opposite end will cause the locking faces $m$ to swing away from beneath the shoulders or projections $m′$ thereby releasing the plunger head from the rack bar or stem F and permitting the latter to advance the knives while the plungers and plunger head remain stationary.

Inasmuch as it may, under some circumstances, be desirable to project the knives, particularly for cleaning purposes, the catch or lock M is adapted to perform a second locking function, i. e. of securing the plunger head L and plungers in their elevated position, for which purpose it is provided with a catch projection or shoulder O adapted to seat over a coöperating or complemental projection O' on the frame B. Thus, when the heads are elevated to their highest position, if the catch M be depressed, the locking connection between the plunger head and stem F will be disconnected and the locking projections O, O' thrown into engagement, whereupon by a forward movement of the handle E, the rack bar or stem F, and the knife head and knives will be advanced while the plunger head and plungers will be held in their elevated position. With the knives advanced to their fullest extent it is a simple matter to remove one of the pins b, tip the whole upper portion of the machine to one side on the base, and give the parts an effective cleaning.

The shaft D before referred to as forming the axis for the operating handle, projects a considerable distance on each side of its bearings in the frame and is adapted for the reception of counterbalance springs P. These springs are coiled about the shaft in rather large convolutions near the center and in small convolutions at the ends, as shown at p, the outer extremities of the springs being secured to the ends of the shaft, as shown at p' in Fig. 1. At their inner ends the springs are held by having their extremities bent forwardly over projections R on each side of the enlargement B' of the yoke frame B, the result being that forward movement of the handle rotates the shaft in a direction to increase the tension on the counterbalance springs and said springs are proportioned to relieve the operator of the work of lifting the weight of the heads, plungers and knives, and he may, therefore, expend his energy entirely in the pressure applied to the dough and for dividing the same into the desired portions.

Having thus described my invention, what I claim as new and desire to secure by Letters Patent of the United States, is:

1. In a dough divider the combination with the frame, reciprocatory plungers and plunger head and reciprocatory knife head, of knives between which the plungers are adapted to reciprocate embodying concentric circular knives and radial knives on both the inner and outer sides of the circular knives, screws connecting the peripheral radial knives to the knife head, recesses in the edges of the circular knives, projections on the outer edges of the peripheral radial knives adapted to fit in the recesses in the outer edge of the adjacent circular knife and retain said knife on the knife head, projections on the inner edges of the intermediate radial knives adapted to fit in the recesses in the inner edge of the last mentioned circular knife whereby said intermediate radial knives are retained on the knife head and projections on the outer edges of the intermediate radial knives adapted to fit in the recesses in the outer edge of the inner circular knife whereby said circular knife is retained on the knife head.

2. In a dough divider the combination with the frame, reciprocatory plungers and plunger head, reciprocatory knife head, of knives between which the plungers reciprocate embodying inner and outer circular knives and radial knives on both sides of and intermediate the circular knives, recesses in the edges of the circular knives, screws connecting the peripheral radial knives to the knife head, projections on the peripheral knives fitting in recesses in the outer edge of the outer circular knife adapted to hold said circular knife to the knife head, projections on the edges of the intermediate radial knives coöperating with recesses in the inner edge of the outer circular knife whereby said intermediate radial knives are retained on the knife head, projections on the intermediate radial knives adapted to coöperate with recesses in the outer edge of the inner circular knife to hold said circular knife on the knife head, and screws connecting a portion of the inner radial knives to the knife head and coöperating projections and recesses in the inner radial knives whereby all of said inner radial knives are retained on the knife head.

3. In a dough divider the combination with the frame, reciprocatory plungers and plunger head and reciprocatory knife head, of inner and outer circular knives, a plurality of intersecting radial knives located within the inner circular knife, radial knives intermediate the circular knives, radial knives on the outer side of the outer circular knife, screws connecting the peripheral radial knives and a portion of the central radial knives to the knife head and interlocking recesses and projections on the circular and radial knives whereby all of said knives are adapted to be retained on the knife head by the screw connected knives.

4. In a dough divider the combination with the frame, reciprocatory plungers and plunger head, and reciprocatory knife head, of knives between which the plungers reciprocate embodying circular knives and peripheral, intermediate and central radial knives, screws connecting a portion of said central radial knives to the knife head, coöperating recesses and projections on the central radial knives whereby the portion of screw connected central knives retain all the central knives on the knife head, screws connecting the peripheral knives to the knife head, recesses in the circular knives and projections on the peripheral and intermediate radial knives adapted to engage the recesses in the circular knives whereby the screw connected peripheral knives retain the circular and intermediate radial knives on the knife head.

5. In a dough divider, the combination with the frame, reciprocatory plunger and plunger head and reciprocatory knife head having radial and concentric grooves therein and projections on said head intersected by the radial grooves, of knives seated in the grooves and projections and screws passing through the head and projections, and edgewise into the radial knives, whereby said knives are secured to the knife head and supported thereon by said projections.

6. In a dough divider, the combination with the base and yoke frame mounted thereon, of the reciprocatory plungers and plunger head, reciprocatory knives and knife head, with means for reciprocating the latter, a locking member pivotally mounted on the plunger head for connecting the plunger head and knife head to move in unison and coöperating locking shoulders on said locking member and frame movable into engagement when the locking connections between the heads are disconnected, whereby the plunger head and plungers may be held in elevated position during the depression of the knife head and knives.

FRANK H. VAN HOUTEN, Jr.

Witnesses:
CLAUDE VAN HOETRAN,
WILLIAM T. STRIPPEL.

Copies of this patent may be obtained for five cents each, by addressing the "Commissioner of Patents, Washington, D. C."